United States Patent [19]

Arnold et al.

[11] Patent Number: 4,774,064

[45] Date of Patent: Sep. 27, 1988

[54] CONVERSION OF CALCIUM COMPOUNDS INTO SOLID AND GASEOUS COMPOUNDS

[75] Inventors: David Arnold, Yazoo City, Miss.; Daniel P. McDonald, Gastonia, N.C.

[73] Assignee: Mississippi Chemical Corporation, Yazoo City, Miss.

[21] Appl. No.: 945,859

[22] Filed: Dec. 23, 1986

[51] Int. Cl.[4] .................. C01F 11/00; C01F 11/46
[52] U.S. Cl. ................................ 423/168; 106/103; 106/109; 106/85
[58] Field of Search ................ 423/168; 106/103, 85, 106/109

[56] References Cited

U.S. PATENT DOCUMENTS

| | | | |
|---|---|---|---|
| 2,426,147 | 8/1947 | Horn | 106/103 |
| 3,729,551 | 4/1973 | Gorin | 423/168 |
| 4,102,989 | 7/1978 | Wheelock | 423/168 |
| 4,287,160 | 9/1981 | von Zander | 423/168 |
| 4,503,018 | 3/1985 | Gardner et al. | 423/168 |
| 4,508,573 | 4/1985 | Harris | 423/168 |
| 4,600,438 | 7/1986 | Harris | 106/100 |

FOREIGN PATENT DOCUMENTS 2812240  10/1979  Fed. Rep. of Germany ...... 423/168

OTHER PUBLICATIONS

Shreve, "The Chemical Process Industries" (1956), pp. 199-205, 214-219, 352-353.
Kirk-Othmer, "Encyclopedia of Chemical Technology", vol. 5 (1979), pp. 180-185.

Primary Examiner—Asok Pal
Attorney, Agent, or Firm—Oblon, Fisher, Spivak, McClelland & Maier

[57] ABSTRACT

The invention relates to a process for the conversion of a calcium mineral into a calcium containing solid product and a gaseous stream which comprises subjecting the calcium mineral to a temperature in excess of about 3400 degrees Fahrenheit for less than one minute.

10 Claims, 4 Drawing Sheets

CONVERSION OF CALCIUM COMPOUNDS INTO SOLID AND GASEOUS COMPOUNDS

BACKGROUND OF THE INVENTION

1. Field of the Invention

The present invention relates to the conversion of calcium compounds into solid and gaseous materials. In one preferred aspect, the present invention relates to the conversion of calcium compounds into a gaseous product and a solid cement clinker product. In another preferred aspect, it relates to the conversion of calcium phosphate materials into phosphorus and its compounds.

2. Description of the Prior Art

Numerous processes for converting calcium mineral compounds into useful products have been proposed. For example, the use of sulfuric acid to decompose phosphate rock into gypsum and phosphoric acid is a widely practiced technique. The conversion of phosphate rock into phosphorus and a calcium silicate slag is practiced to produce phosphorus for uses requiring high purity. Another widely practiced technique is the conversion of calcium carbonate and clay minerals into a cement clinker and carbon dioxide in a rotary kiln. These processes suffer from the deficiency of either consuming large amounts of energy, producing objectionable by-products, or both.

The production of wet process phosphoric acid by the digestion of phosphate rock with sulfuric acid produces a particularly troublesome waste product, phosphogypsum. No suitable means for disposing of the phosphogypsum or converting it to useful products have to date been developed. Some countries dispose of phosphogypsum by dumping it in the ocean. However, in the United States, the phosphogypsum has usually been accumulated in large piles which have associated ponds holding large quantities of water.

Phosphogypsum represents a potential source of significant quantities of calcium and sulfur. Thus, a need exists for an economical process which can convert phosphogypsum into useful calcium and sulfur products.

It would also be desirable to develop a new technique for directly converting phosphate rock into phosphoric acid inexpensively so as to eliminate the wet process technique. If the wet process technique could be replace, the phosphogypsum problem and the need for large sulfuric acid plants would be eliminated.

The only technique which has successfully been suggested as an alternative to the wet process technique is the electric furnace technique. This process produces elemental phosphorus which may then be oxidized and hydrated to produce phosphoric acid. However, phosphoric acid produced using the electric furnace process, while extremely pure, is too expensive to be utilized on a large scale in the fertilizer industry, the major world consumer of phosphoric acid. Thus, the electric furnace acid has found use only in those applications where high purity is required, such as foods, drugs or cosmetics.

The first documented attempts to convert calcium sulfate to sulfur dioxide and cement clinker occurred during World War I in Germany. W. S. Mueller investigated the decomposition of calcium sulfate (anhydrite) and together with H. Kuhne developed a rotary kiln technique to convert calcium sulfate into sulfur dioxide and cement clinker. Subsequently, other plants were built to practice this technique in locations where alternative sources of sulfur were either not available or excessively priced. Hull et al in *Industrial and Engineering Chemistry*, Volume 49, No. 8, August, 1957, pages 1204-1214 contains a summary of the efforts which have been made to convert anhydrite into cement clinker and sulfur dioxide.

Subsequently, with the increased availability of phosphogypsum, it was natural to suggest utilizing phosphogypsum in place of the anhydrite which had previously been utilized. These processes generally involved treating the phosphogypsum to reduce its phosphorus and fluorine content prior to the reaction with silica and other cement forming elements in the rotary kiln. This pretreatment was necessary since phosphorus and fluorine present in the phosphogypsum would result in excessive quantities of these elements being incorporated in the cement clinker product, yielding an unacceptable cement. Although numerous clean-up processes have been developed, none have achieved status as an accepted practice since all such processes have proven too expensive. Thus, this process has been limited to the utilization of comparatively clean phosphogypsum in which the presence of fluorine, phosphorus and other impurities is minimized. However, such processing is cost prohibitive in most cases and little used.

The rotary kiln technique for converting phosphogypsum into cement and sulfur dioxide is described in the article: "Manufacture of Cement from Industrial By-Products," *Chemistry and Industry*, February, 1971. Production of sulfuric acid and cement from phosphogypsum using the "OSW process" is described in: *Chemical Age of India*, Volume 27, No. 12, December, 1976 and "Getting Rid of Phosphogypsum - II", *Phosphorus and Potassium*, No. 89, May/June, 1977. The rotary kiln techniques all utilize a reducing zone followed by an oxidizing zone.

The OSW process, which is typical of the rotary kiln processes, has a residence time of over six hours in the main kiln. These kilns operate at temperatures under 2900 degrees Fahrenheit, typically about 2700 degrees Fahrenheit. These processes consume about 21 million BTU per ton of cement clinker product. The phosphogypsum raw material must contain 0.5% (W/W) or less of $P_2O_5$ and 0.15% (W/W) or less of fluorine to produce an acceptable clinker product. The raw materials are usually pelletized prior to processing. Kiln gases typically contain 9-12% $SO_2$ (dry basis, by volume), but when mixed with sufficient air to oxidize the sulfur dioxide to sulfur trioxide in sulfuric acid manufacture, this stream is diluted to 4-5% $SO_2$. This low concentration of sulfur dioxide requires that larger than normal vessels and auxiliary equipment be employed in sulfuric acid manufacture. This limits the rotary kiln technique to sulfuric acid plants specifically designed to utilize the product gas stream from the rotary kilm. Hence, the rotary kiln technique is limited by requirements of large equipment, high phosphogypsum purity, low energy efficiency and low $SO_2$ product gas strength.

Dr. T. D. Wheelock of Iowa State University studied the technique of decomposing phosphogypsum in a fluidized bed to produce sulfur dioxide and a quick lime product as described in U.S. Pat. Nos. 3,087,790; 3,260,035; 3,607,045; and 4,102,989. As in the case of the rotary kiln technique, the Iowa State technique involves a reducing zone and an oxidizing zone in the reactor. The Iowa State technique produces a sulfur dioxide which can be converted into sulfuric acid, but the quick lime it produces is very impure, thus having little, if any, market value. For decomposition of phosphogypsum processes to be economical, the calcium by-products must be pure enough to have a good market value. Thus, the Iowa State technique is not economically attractive.

It has also been proposed, as by Jonasson et al, *World Cement*, December, 1982, pages 383–388, to produce Portland cement clinker from phosphogypsum in an electric arc furnace. While it is entirely probable that phosphogypsum could be converted into cement clinker and sulfur dioxide in an electric furnace, such a process would be very expensive since large amounts of electric energy would be consumed.

The commercial production of phosphorus is performed in electric arc furnaces. Typical residence times in these furnaces range from four to nine hours operating at temperatures from 2250 to 2650 degrees Fahrenheit. Typical furnaces consume about 12,000 kw-hr. per ton of phosphorus product. The reactants (including phosphate rock, high quality coke, and silica) are usually agglomerated by pelletization prior to introduction into the furnace. Often the phosphate rock and silica require calcination prior to pelletization. In addition to the product phosphorus withdrawn in the process gases, the electric furnace process produces calcium silicate and ferrophosphorus slags which have little, if any, value. Normally, these slags are placed in large slag piles at the production site.

In the past, phosphorus has been produced by blast furnace technology. This process consumed about 2.4 tons of coke per ton of phosphorus produced. The process gas stream contained a very low concentration of phosphorus, and, thus, the process required large vessels and large capital expenditures. Other operating parameters were very similar to those for the electric furnace.

The electric furnace and blast furnace processes both suffer from requirements for large quantities of energy, large equipment and creation of large slag piles. A further problem is that when the desired product is a phosphorus oxide, these processes require that energy be supplied to reduce the phosphate in the ore to elemental phosphorus and that subsequently the phosphorus be oxidized to the desired oxide form. This requires an additional step with considerable loss of energy.

Several researchers have attempted to reduce the energy requirements for phosphorus production by reducing phosphate rock in high temperature plasmas. Chase et al in "Plasma Jet Process for Making Elemental Phosphorus," *Ind. Eng. Chem. Process Des. Dev.*, Vol. 18, No. 2, 1979, pages 261–266, describe a process by which phosphate rock is reduced with liberation of phosphorus in a high temperature plasma. Chase et al were able to obtain their highest yield of eighty-one percent at a calculated reactor inlet temperature of 5525 degrees Fahrenheit with a gas residence time (approximately the same as the solids) of 0.21 seconds. At an inlet temperature of 4445 degrees Fahrenheit and an 0.38 second residence time, the yield fell to 56 percent. However, due to the inherent large thermal gradients in plasma chemical reactors, the solids undoubtedly never reached the reactor inlet temperature. Although such processes effectively reduce phosphate ores at temperatures in excess of 5000 degrees Fahrenheit in very short residence times, the large electrical power consumption required to heat the plasma gas makes such processes uneconomical.

In U.S. Pat. No. 3,481,706, Veltman et al disclose a process by which phosphorus is produced by reducing phosphate rock in a flame. In this process, finely divided preheated phosphate rock and a hydrocarbon or carbon reductant was passed through a flame generated by combustion of a hydrocarbon or coal with oxygen. The flame temperature ranged from 3000 degrees Fahrenheit to 4500 degrees Fahrenheit. Silica could be added to produce a calcium silicate slag if that was the desired calcium product. The phosphate ore was then allowed to fall freely through a reactor one hundred feet in height followed by separation of the gaseous and liquid phases. This reactor was manufactured from refractory lined carbon steel. To avoid excessive cooling throughout the reactor, further heating could be accomplished along the vertical reactor by positioning further burners or by electric discharge on the gas flame. If the flame was augmented by an electric discharge, it was necessary to add an ionizable salt with the phosphate rock. Veltman et al noted, but made no pertinent claim to, the observation "that under certain process conditions, and for reasons not understood, phosphorus oxides may be concurrently produced." These reasons will become more clear as the current invention is revealed, but Veltman et al at best produced very small quantities of phosphorus oxides.

Those skilled in the art recognize that the process of Veltman et al suffers from many deficiencies such as lack of provision for avoiding or removing the massive buildup of solid and liquid products on the reactor walls resulting in excessive heat loss through the walls as well as damage to the refractory wall, and insufficient heating of phosphate ore as it passes through the flame, resulting in low conversion and inefficient use of energy. The result was that the overall temperature of material exiting the reactor was only 3900 degrees Fahrenheit, even with the additional heat input from the additional burners. At 3900 degrees Fahrenheit, the reaction kinetics are slow enough that Veltman et al were unable to obtain complete reaction even during the residence time resulting from a one hundred foot free fall through the reactor.

Attempts have also been made to produce phosphorus by the reduction of phosphate ore in a rotary kiln such as described by Lapple in U.S. Pat. Nos. 3,235,330 and 3,241,914. These processes have been known for some time but have not been practiced because of poor phosphorus yield. In other rotary kiln processes, such as that described by Megy et al in U.S. Pat. No. 4,351,813, phosphorus is released from a bed in a rotary kiln under reducing conditions. In an oxidizing zone over the bed, the phosphorus may be burned to phosphorus oxides with the release of radiant energy which is absorbed by the bed, providing a source of heat for the reduction reaction step. Whereas previous rotary kiln processes for phosphorus production had suffered from problems of premature carbon burnout, excessive liquid phase formation at higher temperatures and excessively slow reaction rates at lower temperatures, Megy et al avoided many of these problems by purging the bed with an inert gas. The use of inert gas allowed Megy et al to avoid excessive liquid phase and to offer improved performance by operating at higher temperatures. Although this process gave excellent yields of either phosphorus or phosphorus oxides, the process suffered from many deficiencies such as requirements for large volumes of purge gas and incomplete combustion of carbonaceous material. Further, because of the formation of excessive liquid phase at temperatures exceeding 2700 degrees Fahrenheit, the reaction kinetics were still so slow as to require large rotary kilns to perform the reaction.

Another approach to the thermal decomposition of phosphate rock has been described by A. L. Mosse et al in "Production of Phosphorus - Containing Compounds in Plasmachemical Reactors When Processing Fine-Dispersed Natural Phosphates," 2nd International Congress of Phosphorus Compounds Proceedings, Institut Mondial du Phosphate, 1980. Mosse et al studied the reaction:

$$2Ca_3(PO_4)_2 = 6CaO + P_4O_{10}$$

in a gas plasma. Mosse et al were able to obtain $P_4O_{10}$ at temperatures as low as 4400 degrees Fahrenheit. Although Mosse et al found good yields, their work was limited by the basic deficiencies of plasma reactors in that they had insufficient residence times, thus requiring excessive temperatures and the energy consumption, due to the heating requirements of the large volume of plasma gas, was excessive. Further, the very short residence time and high degree of dilution by the plasma gas did not allow study of the energetically more favorable reaction:

$$2Ca_3(PO_4)_2 + 6SiO_2 = 6CaO.SiO_2 + P_4O_{10}.$$

This reaction is favorable at temperatures as low as 2800 degrees Fahrenheit.

Thus, there exists a need for a technique which economically converts calcium minerals into useful solid and gaseous products. In particular, a need continues to exist for an improved method for converting calcium minerals into cement clinker and gaseous products.

A further need exists for a technique for converting phosphogypsum into sulfur dioxide and a useful solid calcium product. In particular, for a technique for converting phosphogypsum into a concentrated sulfur dioxide stream and Portland cement clinker.

Still a further need exists for an economical technique for converting phosphate rock into phosphorus and calcium oxide, calcium silicate or Portland cement clinker.

Still a further need exists for an economical technique for converting phosphate rock into phosphorus oxide and calcium oxide, calcium silicate or Portland cement clinker.

SUMMARY OF THE INVENTION

Accordingly, it is an object of this invention to provide an economical process for converting calcium minerals into solid and gaseous products.

A further object of this invention is to provide a technique for converting calcium minerals into gaseous products and cement clinker.

Another object of this invention is to provide a technique for converting phosphogypsum into useful products such as, in particular, for converting phosphogypsum into sulfur dioxide and cement clinker.

A further object of this invention is to provide a technique for converting phosphate rock into phosphorus and lime or a calcium silicate product.

A further object of this invention is to provide a technique for converting phosphate rock into phosphorus oxide and a solid calcium product.

A further object of this invention is to provide a technique for converting calcium fluoride into hydrogen fluoride and a lime product.

Yet another objective of this invention is to provide a technique for converting limestone into cement clinker.

These and other objects of the invention which will become apparent in the description which follows have been obtained by subjecting the calcium compounds to high temperatures for very short periods of time, in particular, by subjecting the calcium compounds to temperatures in excess of about 3400 degrees Fahrenheit for residence times of less than one minute. When it is desired to produce Portland cement clinker, it is necessary to include in the reactor feed, along with the calcium compound, a source of silica and iron so that the resulting solid product has the appropriate composition for Portland cement clinker. It is also necessary to maintain the solid reaction product for a period of time after it exits the decomposition zone at a temperature above 2150 degrees Fahrenheit to obtain the large crystals of tricalcium silicate (usually termed $C_3S$ by those knowledgeable in cement chemistry) necessary for good quality Portland cement clinker. In the production of hydrogen fluoride it is also necessary to add a hydrogen source such as water.

The source of heat for the high temperature decomposition may be supplied through electric resistance heaters, radiant heaters and the like or by the introduction of fossil fuel coincident with the reactants into the reaction zone and combusting the fossil fuel in the reaction zone or by a combination of these.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
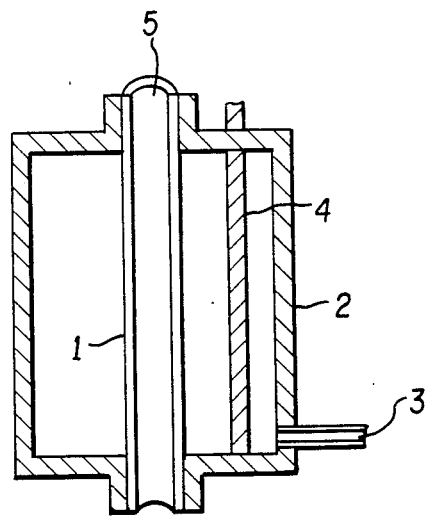
FIG. 1 depicts a high temperature fluid wall reactor of the type employed in the present process.

The calcium minerals which can be treated in the present invention comprise essentially any calcium mineral which can be decomposed to calcium oxide and a gaseous product. This includes calcium sulfate as found in its various forms such as phosphogypsum, calcium sulfate hemihydrate, anhydrite, natural gypsum, and chemical gypsum. In addition to calcium sulfate, other calcium mineral compounds include phosphate rock, calcium fluoride, calcium carbonate and the like. In general, the calcium oxide product from the reaction will be recovered in the form of Portland cement clinker which is obtained by adding to the reaction zone a source of silica, alumina and iron in combination with the calcium mineral. When it is not desired to produce Portland cement clinker, the solid product will constitute calcium oxide.

Phosphogypsum is a by-product of the wet process for the production of phosphoric acid. This phosphogypsum contains, in addition to calcium sulfate, small quantities of phosphorus, fluorine, metal compounds, water and other impurities associated with phosphate rock. Anhydrite, which is a naturally occurring calcium sulfate found in many locations, may contain impurities but generally is of significantly greater purity than phosphogypsum. Naturally occurring gypsum is also found in many areas of the world. Chemical gypsum is obtained as a by-product in numerous chemical processes. Flue gas scrubbers produce chemical gypsum through the reactions of sulfur oxides with lime particles or with an aqueous solution of lime. The present process offers an economical method of recovering the sulfur dioxide as a useful product and regeneration of the lime for recycle to the scrubbers or for the manufacture of Portland cement clinker. Chemical gypsum is also obtained in the production of hydrofluoric acid from calcium fluoride. Other sources of chemical gypsum are also useful as starting materials for the present process.

Essentially any phosphate rock may be utilized as a starting material for the present process. If the phosphate rock is of low grade (that is, it does not have a high concentration of calcium phosphate), it may be advantageous to subject the ore to conventional beneficiation processes prior to introduction into the process. Common phosphate rock can be frequently characterized as the mineral apatite which has the chemical formula: $Ca_{10}(PO_4)_6F_2$. However, phosphate rock having different chemical constituents and mineral forms may also be employed in this invention.

Other calcium minerals may be employed in the process provided they may be reacted in a manner to produce a lime and gaseous products. Examples include calcium fluoride and calcium carbonate.

The source of energy for the high temperature reaction may be any heat source including electric resistance heat, radiant heat, or heat generated by combustion of fossil fuels, wood chips or other organic matter or any combination of heat sources. The only criterion is that the source of heat be sufficient to achieve and maintain the desired temperature, generally above 3400 degrees Fahrenheit. The preferred fuels include petroleum coke, coal, heavy oils, natural gas, methane and the like. It is preferred to use high sulfur fuels with low volatiles when one reactant is calcium sulfate so as to increase the concentration of sulfur dioxide in the product gas. Such high sulfur fuels include delayed petro-coke which has low volatiles and may contain high sulfur. Petro-coke is relatively less expensive because of its production as a waste by-product from the refining of heavy crude oil so that nearly every refinery must produce at least some petro-coke. With respect to coals, the high sulfur coals commonly mined in Illinois and the other eastern coal fields are preferred because of their high sulfur content. High quality fossil fuels such as natural gas can also be used in the process.

When sulfur dioxide is not the desired product, it may or may not be advantageous to use high sulfur fuels. If high sulfur fuel is used, then appropriate scrubbing devices should often be included to avoid atmospheric pollution or, if product purity is not critical, it may be possible to recover the sulfur oxides along with the product.

When it is desired to manuaacture Portland cement clinker, sources of silica, alumina and iron are necessary and must be added to the reactor along with the calcium compound starting material. Suitable sources of silica and aluminum oxide are the clays conventionally used in production of Portland cement clinker in the rotary kiln processes. Iron oxide by-products such as iron scale provide a suitable source of iron. When the calcium compound is calcium sulfate, the presence of silica and alumina and iron oxides is beneficial since they assist the decomposition of calcium sulfate. In particular, the silicon and iron oxides have a catalytic effect on the reaction rate of the calcium sulfate decomposition. The alumina and silicon oxides tend to suppress the reverse reactions of the thermal decomposition such as the reaction of lime with sulfur dioxide and oxygen. Thus, the presence of these materials assists in the overall reaction scheme in addition to providing the materials necessary to produce Portland cement clinker. The quantities of silica, alumina and iron sources to be added are selected to produce the desired solid product composition and may be routinely determined. When one desires only to produce calcium oxide, the utilization of sources of silica, alumina, and iron oxides is not necessary but it may be preferred to include small quantities of these oxides so as to assist in the overall reaction. When one is manufacturing Portland cement clinker from the phosphogypsum, the amount of clay which must be added to achieve the necessary quantities of silica and alumina and iron oxides in the Portland cement clinker is usually more than adequate to provide the necessary quantities for catalysis of the reaction. Furthermore, some silicon dioxide is normally present in the phosphogypsum. The composition of the phosphogypsum determines the amount of silica, alumina and iron oxides to be added to yield a clinker with the proper formulation. A typical composition can be given by ASTM Standard Specification for Portland cement C-150-80 (Type II): $SiO_2$: 20.0% min.; $Al_2O_3$: 6.0% max.; $Fe_2O_3$: 6.0% max.; MgO: max.; LOI: 3.0% max.; Insoluble residue: 0.75% max.

Typically, it is desirable, but not required, that the feed be free flowing, preferably less than 30 mesh, and more preferably less than 100 mesh (150 microns diameter) since finely divided particles react to completion at a faster rate thereby allowing shorter residence times and smaller reactors. Phosphogypsum, which is mostly $CaSO_4 \cdot 2H_2O$, is typically a damp, slightly sticky material which contains some agglomerates larger than 100 mesh. However, the larger particles and agglomerates break up during drying or dehydration (to calcium sulfate hemihydrate or anhydrite) yielding particles smaller than 100 mesh so that grinding or sizing is unnecessary when these steps are performed prior to reaction. In general, grinding or sizing steps are unnecessary with other forms of gypsum but if necessary can be accomplished in conventional equipment. Since drying (and/or dehydration) of gypsum can be accomplished at less expense of energy in conventional drying equipment than in the high temperature reactor, it is usually advantageous, but not necessary, to carry out these steps prior to decomposition to produce sulfur dioxide. Any of several methods of drying and dehydration may be used, but those that do not involve agglomeration are preferred.

Other raw materials may require some grinding which may be accomplished in conventional comminution devices. When a solid fossil fuel is being used as the heat source, it is especially desirable that this material be finely divided. Since the rate of combustion of solid fossil fuels is highly dependent upon particle size, the initial particle size can be utilized to control the combustion rate. When utilizing petro-coke, it is preferred that the coke have a particle size of less than 100 mesh, but with the particular particle size being selected to match combustion rate to the reactor residence time and the reaction rates of the chemical constituents present.

If the fossil fuel is too large, then the other constituents could completely react before the fossil fuel is completely combusted, resulting in excessive fuel consumption. If the fossil fuel is too small, then the combustion could be completed before the other constituents can react to the desired extent, resulting in incomplete reaction. A mathematical model for the combustion of fossil fuels is described by M. A. Field et al in *Combustion of Pulverized Coal,* British Coal Utilisation Research Association, 1967.

Once the materials have been blended, the starting materials can be added directly to the reaction zone. This is particularly true when the starting materials are substantially dry such as phosphate rock, calcium carbonate, anhydrite, natural gypsum and chemical gypsum. However, when the starting material is phosphogypsum or calcium sulfate hemihydrate these materials will include substantial quantities of free water. It is desirable to dry these materials to remove the free water. Furthermore, phosphogypsum, calcium sulfate hemihydrate and natural and chemical gypsum contain waters of crystallization. If desired, the starting materials can be dried sufficiently to remove even this water although this is not necessary. In general, it is desirable that the water content of the feed material entering the reactor be less than about 30 wt. %, preferably less than 20 wt. % and more preferably less than 5 wt. % and most preferred less than 1.0%. When Portland cement clinker is being produced, the clay generally will contain some water as well. Thus, the water contained in the clay must also be considered in drying the starting materials. While it is contemplated that the starting materials will be dried after they have been mixed together, it is also possible to individually dry the starting materials if that is desired. This may be particularly advantageous where only one of the feed materials contains water and the others are substantially dry. This is particularly true when one is manufacturing calcium oxide and the starting materials comprise a water containing calcium mineral source and substantially dry fossil fuel. It will probably be easier and cheaper to dry the calcium source separately prior to admixing with the fuel. Similarly, when the starting materials include clay, the water content in the feed mixture to the reactor may be reduced by drying only one of the calcium source or the clay. While it is desired that the water content of the reactor be less than 30%, water contents greater than 30% can be tolerated but will increase the energy requirement because of the need to heat water up to the reaction temperature. Thus, the degree of dryness is determined by the economics of the energy required to dry the starting materials when compared with the additional energy consumed in the reactor by the presence of the water vapor.

The feed mixture is introduced into a suitable reactor and subjected to the reaction temperatures. Generally, the reaction temperature will exceed 3400 degrees Fahrenheit. There is no theoretical upper limit on the temperature and the reactants may be subjected to any temperature which the reactor itself can withstand. Generally, it is anticipated that the reaction temperature will be less than 7600 degrees Fahrenheit because of the cost of fabricating a reactor which can withstand higher temperatures. When utilizing a fossil fuel as the heat source, the reaction temperature will range from 3400 degrees Fahrenheit to about 5800 degrees Fahrenheit.

The reaction temperature is matched to th characteristics of the reactor, in particular, residence time, thermal gradients, and the kinetics of the desired reaction. For a 100 mesh size material and a reactor residence time of 250 milliseconds, a temperature of about 4425 degrees Fahrenheit will give substantially complete decomposition of a proper feed mixture containing phosphogypsum and a silica source to yield a sulfur dioxide containing gaseous product. For reactors with longer residence times, lower temperatures are effective, approximately 4000 degrees Fahrenheit for one second residence time to obtain the same result from the above feed mixture. Similarly, a reactor with shorter residence time would require higher temperatures to obtain the same result.

When the starting materials contain calcium sulfate, the desired reaction temperature is also determined by the desired degree of sulfur removal. If the solid product is to be handled as a waste byproduct, then the degree of sulfur removal is less important and temperatures as low as about 3400 degrees Fahrenheit may be employed at less than one minute residence time to yield a sulfur dioxide containing gaseous stream. However, when it is desired to convert the solid product into Portland cmment clinker or high grade lime it is necessary to accomplish substantially complete sulfur removal so that higher temperatures are usually preferred to accomplish this goal. Alternatively, when lower temperatures are utilized it is possible to achieve the desired sulfur removal from the solid product by a series of reactors or by recycling material through a reactor.

The reaction temperature in the reactor is determined as the highest temperature attained by the reactants as they flow through the reaction zone. As will be recognized, there will be a temperature profile in the reactor where at the entry point of the feed, the temperature will be that of the entering feed materials, increasing to a maximum temperature in the reactor as combustion and heat transfer proceeds and then dropping to a somewhat lower temperature at the reactor exit. The entry temperature into the reactor can range from ambient to as high as desired. Generally, when the reactants are not dried, the initial reaction temperature will be ambient. When the reactants have been dried, then the entry temperature will be determined by the temperature to which the reactants were dried. The maximum entry temperature is determined largely by the economics of preheating the reactants but should be as high as practicable. However, when the energy is being provided by combusting a fuel in the reaction zone, the entry temperature must be below the ignition temperature of the fuel so as to prevent premature ignition. When utilizing the fossil fuel, generally the reactants will be introduced at less than 1380 degrees Fahrenheit and more preferably at about 1300 degrees Fahrenheit.

The reactor to be used in this process must be capable of withstanding the high temperatures utilized in this invention. Fabrication of suitable reactors is well known in the art. One such type of preferred reactor would be the double tube reactor described in U.S. Pat. Nos. 3,933,434; 4,036,181; 4,042,334; 4,044,117; 4,056,602; 4,059,416; 4,095,974; 4,181,504; 4,199,545 and 4,208,373. This reactor will hereafter be referred to as the HTFW (High Temperature Fluid Wall) reactor. Those skilled in the art will recognize that this is only one suitable design and that other configurations and construction are also suitable. As described in more detail below, the HTFW reactor has the capacity to hold material at high temperatures for sufficiently long residence times. Also, because of the thermally neutral fluid wall, heat is not lost to an appreciable extent from the reactants to the outside environment through the reactor wall, and solid and liquid material do not build up and damage the reactor walls. Further aforementioned controlled combustion allows smooth temperature gradients thoughout the reactor.

FIG. 1 depicts an HTFW reactor of the type that may be employed in the present process. The reactor consists of a vertical reaction tube, numeral 1, enclosed by an outer jacket, numeral 2, which serves as a structural vessel. This outer jacket is insulated to limit heat losses. A blanket gas, numeral 3, is supplied to the annular space between the reaction tube and the outer wall for purposes explained below. Electric resistance heaters, numeral 4, are placed in this neutral atmosphere to supply the energy necessary for the reaction, or if the reactants include a fuel, then the electric resistance heaters supply only a part of the heat requirements. Reactants are introduced at the top of the reaction tube, numeral 5, and allowed to flow downward by gravity.

The central reaction tube is a hollow cylinder made of porous refractory material. In most cases it is desirable that the material be capable of absorbing and re-emitting radiant heat to activate the reactants fed to the interior space. The tube may be constructed as either a single cylinder or interlocking cylinders or a cylinder constructed of interlocking bricks. The tube material is preferably porous so that the blanket gas which provides the neutral gas for the heaters is allowed to migrate through the wall to the core. The flow of this gas through the wall creates a blanket along the inner wall of the reaction tube thereby protecting the wall from the chemical reactants by preventing the buildup of solid or liquid material on the wall. The amount of gas which will pass through a given degree of porosity is a function of temperature since the gas viscosity increases significantly with temperature. Since a significant temperature gradient exists between the entry point of the reactants at the top of the reaction tube and the point at which the maximum temperature of the reactants is reached, the preferred porosity of the tube would be lower in the cooler sections and greater in the hotter sections to allow an even flow of blanket gas into the core and to reduce the quantity of blanket gas required. The differences in porosity are determined by the temperature and can be calculated by known thermodynamic relationships. The preferred amount of blanket gas utilized is the minimum amount necessary to keep reactants off the reaction tube wall to protect the wall from damage and to avoid heat loss from the reaction tube. Generally, it has been found that approximately three standard cubic feet per minute per square foot of inner tube wall area is sufficient, but more or less may be required depending on the operating temperatures.

Selection of suitable refractory materials for the reaction tube is dependent upon the operating environment. At temperatures below 5000 degrees Fahrenheit and with frequent temperature changes, graphite would be one preferred material. At higher temperatures and long continuous operation, ceramics may be preferred.

The blanket gas may be any gas which will not enter into undesirable side reactions or react with the reactor walls. It is also desirable that the blanket gas be transparent to radiant energy. Suitable blanket gases of this type include nitrogen, carbon monoxide, carbon dioxide, the noble gases and the like. When the central tube is constructed from porous carbon, a dry blanket gas is preferred since water vapor will react with carbon at high temperatures. When the reaction tube is constructed from other materials, the presence of water may be less critical.

The electric resistance heaters are normally placed in the annular space between the reaction tube and the outer jacket. However, when the reaction energy is supplied solely by electric energy, the central tube may function as the heater by application of electric current to it. In general, heaters will not be placed inside the reactor tube core where they could be damaged by hot reactants. When the reaction energy is supplied solely by combustion of a fuel, the heaters are not necessary. However, it is often desirable to provide some electric energy heat to avoid heat losses in the reactor especially avoiding the temperature gradients often found in or next to the reactor walls. Such gradients are inherent in the design of many other types of reactors. Thus, the electric energy may comprise from zero to one hundred percent of the total energy to the reactor, but economic considerations usually favor a minimum of electric energy, typically less than 50% of the total energy, more preferably less than 15% and most preferably less than 5%. When all or part of the energy is supplied by electric heaters placed in the annular space, the reaction tube should be fabricated of materials capable of absorbing and emitting radiant energy.

The method of feeding reactants to the top of the reaction tube is not critical and well known techniques for feeding solids may be used. However, because of the extremely short residence times required at the high temperatures employed in this invention, a method which insures a constant feed rate is desirable. It is preferred that the reactants flow through the reactor under the force of gravity since free fall provides a smooth flow through the reactor tube. In the HTFW reactor, turbulent flow may violate the fluid wall created by the blanket gas and could result in solid buildup or destruction of the tube. If the reactor is heated totally by electric energy, the reactants will pass through the reactor subject to gravity and the velocity of the product gases. When a combustible fuel serves as the energy source, the reactants will also be accelerated by the velocity of the combustion gases. Thus, sizing of the reactor to allow adequate residence time is dependent not only on the reactants and temperature but also the energy source.

The HTFW reactor is one type of preferred reactor, but other reactors which demonstrate the preferred characteristics could be used. Among the preferred characteristics are the ability of the reactor to afford sufficient residence times at the high temperatures so that the reaction can proceed to the desired degree. Further, the reactor design should not yield temperature gradients which would result in incomplete reaction. Also important is that the reactor not be damaged by high temperatures or by the buildup of material on the reactor walls. When the desired solid product is Portland cement clinker, it is important that the solid reactor product be finely divided since large lumps, such as those resulting from buildup, should not be present as they would be difficult to handle in downstream processing. When the concentration of product gas is important, addition of non-reactive gases, such as the gas which forms the fluid wall in the HTFW reactor, should be minimized.

When the heat source is a fuel burned in the reaction zone, it is necessary to introduce a source of oxygen with the reactants. The source of oxygen can be air, air enriched with oxygen, or substantially pure oxygen. The amount of oxygen added should be that sufficient to yield complete combustion of the fuel. Depending on the reactants and products, that amount of oxygen may provide for either a reducing atmosphere or a neutral to oxidizing atmosphere in the reaction zone. This is quite different from the rotary kiln technology where two distinct reaction zones are present, one reducing and one oxidizing. In the present process there is essentially only one reaction zone. When the heat source is derived from a carbonaceous material such as petro-coke, a reducing atmosphere would be one in which carbon is burned to carbon monoxide while a neutral to oxidizing atmosphere would be one in which the carbon is burned to carbon dioxide. The source of oxygen is chosen so as to yield a desired concentration of product gas in the off-gas that is suitable for further processing. When it is desirable to maximize the concentration of the product off-gas, it is desirable to use substantially pure oxygen to burn the fuel. In the case of production of sulfur dioxide from phosphogypsum, a twenty percent (by volume) concentration of sulfur dioxide can be obtained when a fossil fuel is burned in substantially pure oxygen. However, when air is the source of oxygen, the sulfur dioxide concentration may be as low as about 1.8 percent. If the energy is provided solely by electricity, no oxygen is required and a 65 percent (by volume) sulfur dioxide concentration is possible. Other reactants yield off-gas concentrations affected in the same manner although the percentages will be different.

Another consideration when utilizing air or air enriched with oxygen is that it is not possible to achieve as high a temperature as when pure oxygen is used as the oxygen for combustion of fuel. Since the rates of decomposition of calcium compounds are functions of temperature, lower temperatures require longer residence times to achieve the same degree of decomposition. The longer residence times and the increased volumes of gases obtained when utilizing less than one hundred percent oxygen requires larger vessels for the decomposition reaction and downstream processing. Since these vessels must be constructed of expensive materials capable of withstanding the high temperatures involved in this invention, it is often desirable to minimize the size of the reactor by using as high a temperature as possible. Of course, the residence time can also be reduced to an extent by preheating the reactants to temperatures near the reaction temperature prior to introduction to the reactor.

Thus, the choice of air or oxygen or a combination thereof to ignite and combust the fossil fuel will be determined by the desired residence time, reaction temperature and desired concentration in the product gas stream as well as the degree of decomposition desired.

If impure products are the desired result, the utilization of air, lower reaction temperatures and the like are possible.

The reactor operates and has a temperature profile as previously described.

The products exit from the reactor at extremely high temperatures, generally approaching the maximum operating temperature when the energy is supplied solely by electricity and sometimes exceeding the electric heater temperature when combustion assisted operation is practiced. It is desirable to recover as much of this heat as possible. Any well known heat recovery technique can be practiced but it is usually preferred to use a heat recovery chest larger than the diameter of the reactor so that fouling of the inner walls is prevented and heat transfer is achieved primarily by transfer of radiant energy. The heat recovery medium could be water from which steam is produced and the steam could be used to operate steam turbines to power mechanical equipment or to generate electric power. Such heat recovery also includes cooling of the solid products from the reactor so that the solids are obtained in a form not containing excessive liquid phase which could complicate downstream processing of the solids.

Following the heat recovery chest, a gas solid separator is necessary to separate the product gas from the product solids. Any type of well known solid-gas separation devices, such as cyclonic type separators, can be used.

The solids exiting the separation device may be recovered as such or subjected to further processing. If the soleds are to be used for cement clinker manufacture, the solids must be maintained above 2150 degrees Fahrenheit for a minimum of fifteen minutes to achieve the desired tricalcium silicate crystal formation necessary for Portland cement clinker. This controlled quenching can be accomplished in many of the various types of vessels designed for this purpose, such as a rotary cylinder having a configuration like a rotary kiln. Cooling in this type of clinker reactor is usually achieved by the introduction of gases at the cold end of the clinker reactor. The product clinker exiting from this reactor is typically too hot for convenient handling and further cooling, such as that practiced in the cement industry, to about 150 degrees Fahrenheit can be achieved in vessels such as the rotary cylindrical cooling devices or other cooling devices known to those skilled in the art. It is often economical to use the hot exit gases from the cooling devices as the cooling medium in the clinker reactor or as a heat source to dry feed materials.

When the product is simply lime, the clinker reactor is unnecessary but some technique for cooling the lime should be practiced. Cooling is particularly advantageous to affect additional heat recovery from the solids.

When phosphogypsum is a reactant in this invention, an important advantage of this invention is that appreciable quantities of phosphorus will be volatilized from the phosphogypsum. This allows phosphogypsum having a high phosphorus content to be used as a starting material for the production of cement clinker, overcoming problems that plague the prior art. Additionally, substantial quantities of fluorine are volatilized. In fact, the addition of fluorine as an additive to the product clinker may be necessary to obtain the desired set time for the cement mortar or concrete prepared from the clinker. The cement industry has long recognized the value of small quantities of fluorine to increase the rate of strength gain thereby offsetting the effect of phosphorus which decreases the rate of strength gain. The total quantity of phosphorus in the clinker is not critical if the appropriate additives are mixed with the ground clinker so that the concrete or mortar meets the strength and physical property requirements, such as the ASTM strength and physical tests which are well known to those skilled in the art. However, reduction of the phosphorus content does allow these tests to be met with either no or decreased amounts of additives.

If the product gas from the decomposition of gypsum is to be used for sulfuric acid production, then the presence of phosphorus or fluorine in the sulfur dioxide may affect the life of the sulfuric acid plant catalyst. The effects on the catalyst may be reduced by subjecting the product gases to any of the widely practiced purification techniques prior to subsequent use. Since the effects will usually be minor, the decision as to the use of purification techniques is dependent upon the cost of investment and maintenance of purification equipment versus the cost of the catalysts and upon the purity of the calcium sulfate raw material.

The production of sulfur dioxide from calcium sulfate by the present invention is carried out in a neutral to oxidizing atmosphere so as to avoid the formation of reduced forms of sulfur and to assure complete carbon combustion. Based on experimental data as presented in Examples One and Two on the high temperature decomposition reactions and the low temperature (2200 degrees Fahrenheit) experiments reported by Martin et al, "Decomposition of Gypsum in a Fluidized-Bed Reactor," Bureau of Mines Report of Investigations 6286, 1963, a mathematical model was developed to describe the high temperature kinetics of the first-order decomposition:

$$CaSO_4 = CaO + SO_2 + \tfrac{1}{2}O_2.$$

Because the rate of the above reaction is much slower than subsequent reactions of the calcium oxide or silicate, it controls the rate of decomposition of calcium sulfate to solid and gaseous products. The rate of decomposition of $CaSO_4$ can be calculated using a first order rate equation with the following rate constant determined from experimental data:

$$k = 1 \times 10^{11} \exp(-E/RT)$$

where $$E = 77000 - 3000\,(10\,Fe_2O_3/CaO) + (SiO_2/CaO)$$

cal/g-mole for $Fe_2O_3/Ca$ mole ratio less than or equal to 0.15 and $SiO_2/CaO$ mole ratio less than or equal to 1.00. Mole ratios above these values do not result in further decreases in the activation energy (E). When carbon is present, the activation energy is lowered by a further 1000 cal/g-mole. Temperature in this expression is given in degrees Kelvin and R is the conventional universal thermodynamic constant.

In a similar fashion, the rate of the reverse reaction was described by the relationship (in pounds per hour):

$$Rate = (62.4/P_{solid})(K_b)(P_{so2}/122414)(273/T_s)(-W_{CaO})(\theta_s)(80)(S)$$

where:
$P_{solid}$ = average density of solids
$K_b = 8.64 \times 10^8 \exp(-10000/RT_s)$
$P_{so2}$ = partial pressure of $SO_2$ in atmospheres
$W_{CaO}$ = weight of CaO present
$\theta_s$ = residence time of solids
$S = (1 - (SiO_2/CaO) - (Al_2O_3/CaO)$ where $SiO_2/CaO$ and $Al_2O_3/CaO$ are mole ratios. For S less than zero this equation is not valid and the back reaction can be neglected.

These equations describe the rates of calcium sulfate decomposition and the reverse reaction in the temperature range of the present invention. These equations, along with known thermodynamic relationships, combustion kinetics of fuels, heat transfer expressions, equations for gas and solid velocities (including blanket gas where applicable), and other mathematical expressions for physical properties, provide a basis for a mathematical model of the high temperature reactions that shows excellent agreement with experimental measurements. This mathematical model also provides a basis for establishing optimal design considerations. Further, the mathematical model can be adjusted by substituting the proper expressions to yield a model for other high temperature reactions. This model also demonstrates the advantage of high temperature reactors such as the HTFW reactor which are capable of sustained high temperatures for substantially longer residence times than that available in other high temperature reactors such as gas plasma type reactors. Additionally, the high temperature reactors of design similar to the HTFW reactor are more energy efficient.

The present invention, when utilizing a reducing atmosphere, can be used to produce elemental phosphorus from phosphate rock by the following equation:

$$2\,Ca_3(PO_4)_2 + 10\,C = 6\,CaO + P_4 + 10\,CO$$

when a source of carbon is used for the high temperature reaction. Further, with properly sized carbon at temperatures exceeding 3400 degrees Fahrenheit in the present invention, a proper mixture will allow phosphorus production to exceed the rate of carbon combustion so that the heat of reaction may be provided by other sources such as radiant energy.

Another advantage over other reaction systems is that at the longer residence times employed in the present invention, silica may be added which will have time to mix with the calcium oxide product of the above reaction thereby yielding a calcium silicate product which is not only more favorable energetically but also effectively blocks the back reaction which can occur upon cooling of the solid or liquid phase products in the presence of the reaction product gases. Such beneficial effects of silica are minimal in plasma type reactors because of the short residence time of the high temperature calcium containing liquid phase and the infrequent particle collisions with the large gas content in the reaction zone of such reactors.

The present invention, when producing a calcium silicate solid product gives phosphorus yields of about ninety percent at about 4400 degrees Fahrenheit in a 250 millisecond residence time. Higher temperatures would require even shorter residence times and lower temperatures would require somewhat longer times.

It is an advantage to employ a finely divided feed material to insure proper mixing particularly when employing a solid carbon source. The size of feed material should be chosen with proper consideration of residence time and temperature but a 50 micron median particle size is adequate for most conditions.

The production of phosphorus oxides from phosphate rock is also possible by the present invention. The silica assisted reaction:

$$2\ Ca_3(PO_4)_2 + 6\ SiO_2 = 6(CaO \cdot SiO_2) + P_4O_{10}$$

is known to be favorable at temperatures as low as 2800 degrees Fahrenheit. However, since the rate of phosphorus production exceeds the rate of carbon combustion at the high temperatures employed in the present invention, if the carbon is properly sized, operating the present invention in a neutral to oxidizing atmosphere allows phosphorus oxide to be produced and allows carbon combustion to provide the energy necessary for the reaction (although the energy may be provided by alternative sources). In general, a size of 50 microns is adequate for most reactor conditions.

The present invention may also be used to produce lime and hydrogen fluoride by the high temperature reaction of water vapor with calcium fluoride:

$$CaF_2 + H_2O = CaO + 2HF.$$

Other high temperature decompositions of calcium mineral compounds may also be envisioned with the present invention.

The following non-limiting examples illustrate the operation of the subject invention to produce gaseous and solid products by the high temperature decompositions of calcium compounds:

EXAMPLE ONE

This example demonstrates the high temperature production of sulfur dioxide by decomposition of phosphogypsum. A series of tests were performed in a HTFW reactor of the type described in U.S. Pat. Nos. 3,933,434; 4,036,181; 4,042,334; 4,044,117; 4,056,602; 4,059,416; 4,095,974; 4,181,504; 4,199,545; and 4,208,373. The reaction tube was a porous carbon tube six feet in operating length with an inside diameter of five and one-half inches and an outside diameter of six and one-half inches. Electrical energy was supplied by three carbon resistance heaters placed between the inner and outer tubes. Current through these heaters was adjusted to yield the desired temperature as measured by an optical pyrometer. Nitrogen gas was forced through the porous reaction tube into the reaction chamber to maintain the protective fluid wall on the inside of the tube. The phosphogypsum used in these tests was dried and dehydrated to the hemihydrate form in conventional drying equipment. Feed materials were all ground to less than 100 Tyler mesh. Chemical analyses of the feed components are given in Table One. The feed mixture is given in Table Two. This feed material was introduced into the top of the reactor by a vibrating screw feeder calibrated to deliver feed at the desired rate. At the end of each run, the mixture remaining in the feeder hopper was weighed to allow the average feed rate to be calculated. The slags were collected in a hopper located below the heat recovery chest and consisted mostly of very small spherical beads having a glassy appearance.

A summary of test results is given in Table Three for several different reaction conditions. Temperatures in Table Three are the maximum temperature as calculated from the mathematical model and confirmed by optical pyrometry. Thirteen to twenty-three percent of the energy requirements were supplied by combustion of the petro-coke and the remainder by electricity. Heat losses, in the small reactor used in these tests, represented over sixty percent of the energy consumption. Average particle residence times (as calculated from the mathematical model) ranged from 180 to 230 milliseconds.

The volatization of sulfur dioxide was determined from slag analysis and confirmed by gas analysis.

Table Three shows that 80 to 97 percent of the sulfur in the calcium sulfate hemihydrate was converted to sulfur dioxide, demonstrating the ability to quantitatively decompose phosphogypsum to calcium silicate and sulfur dioxide in the present invention.

Analysis of the slags demonstrated that an average of twenty-five percent of the phosphorus and fifty percent of the fluorine contained in the phosphogypsum raw material were volatilized in these tests (results depended upon residence time, temperature and feed rate).

EXAMPLE TWO

This example demonstrates that the product from Example One is suitable for processing into cement clinker. Utilizing the same phosphogypsum feed as utilized in Example One (analysis given in Table One), multiple pass experiments were conducted in the six inch diameter reactor to simulate the results in a single reactor with longer residence times. Material was passed through the reactor described in Example One for three passes at a maximum temperature between 4420 and 4425 degrees Fahrenheit. After three passes, sulfur release always exceeded ninety-nine percent.

Petrographic examination shows the calcium present primarily as dicalcium silicate ($2CaO \cdot SiO_2$) and free lime. This clinker precursor was mixed with calcium carbonate and potassium sulfate to yield a mixture with a higher calculated (Bogue) $3CaO \cdot SiO_2$ ($C_3S$) content, yielding a cement of potentially improved early strength. Two mixtures (Batch A and Batch B) were prepared. Batch A contained 82 percent reactor product, 17 percent calcium carbonate, and one percent potassium sulfate. Batch B contained 85 percent reactor product, 14 percent calcium carbonate and one percent potassium sulfate. Chemical analyses of the two batches (with additives) are given in Table Four. Also given in Table Four is the chemical analysis of a commercially available clinker.

Each batch was then burned at 2730 degrees Fahrenheit for twenty minutes. Further tests in which the clinker precursors were burned at 2550 degrees Fahrenheit for sixty minutes were also performed. Table Five summarizes the results of these runs. Petrographic and microscopic examination showed excellent crystalline formation of $C_3S$ despite the presence of phosphorus. The effects of phosphorus were apparently offset by effects, well known to those skilled in the art, of the presence of fluorine.

The clinkers from these tests were then interground with gypsum in a ball mill as is practiced in the cement industry to yield cement products. Grinding conditions are outlined in Table Six. The commercial clinker was also mixed with gypsum in the amount normally used in the cement industry.

Cement paste mixes were then prepared by mixing one part water with two parts cement and formed into one inch cubes which were cured at 73 degrees Fahrenheit. Time of set was determined by the Modified Vicat method as measured by the time of ten millimeter penetration in the two millimeter Vicat needle. No premature stiffening was observed.

A summary of the cement paste cube tests is given in Table Seven. Set times, although slightly longer than the commercial clinker used in these tests, are still well within the range for excellent quality cement. The compressive strengths, on the whole, are slightly lower than the commercial clinker but are well above the values found with many commercial clinkers and the ASTM standards for Type I Portland cement clinker. The results show that a slower burn at lower temperatures may be preferred over a faster burn at higher temperature.

Thus, this example demonstrates that good quality Portland cement clinker can be prepared by burning the clinker precursor prepared from the thermal decomposition of gypsum at 2550–2730 degrees Fahrenheit for twenty minutes or longer. Importantly, it should be recognized that the addition of calcium carbonate to the clinker precursor can be avoided by adjusting the mixture of feed to the high temperature reactor since the solid calcium product of the high temperature decomposition is predominantly a mixture of dicalcium silicate and free lime. Depending on the desired final properties and the composition of the clinker precursor, the addition of other additives may or may not be desirable.

EXAMPLE THREE

This example demonstrates the validity of mathematical modeling to the high temperature decompositions of calcium minerals. A number of tests were run in the reactor described in Example One and a similar reactor which had a three inch diameter inner core reaction tube. Feed materials included both the dried and partially dehydrated phosphogypsum (PGH) used in Example One and a sample of the same phosphogypsum which was dried without dehydration (PGD). Analysis of the second feed is given in Table Eight. Mixes were prepared as in Example One to yield the feed mixture compositions given in Table Nine. Temperatures in Table Nine are the maximum temperatures as measured by optical pyrometry.

The data in Table Nine demonstrate the excellent agreement between measured sulfur removal and the sulfur removal as calculated by the aforementioned mathematical model. This demonstrates the capability of the mathematical model to provide excellent descriptions not only of the high temperature reaction kinetics and thermodynamics but also to provide an excellent description of high temperature reactor performance.

EXAMPLE FOUR

This sample demonstrates the high temperature production of phosphorus from phosphate rock by the present invention. The tests described belo were run in a reactor of the type described in Example One. Feed materials were introduced as described in Example One with the feed dispersed with gases introduced prior to introduction to the HTFW reactor. Upon leaving the HTFW reactor, the material passed through a sixty inch long, eighteen inch diameter cooling zone prior to reaching a baffled product collection box where the gas and solid products were separated.

In a temperature calibration test, reagent grade aluminum oxide (m.p.=3760 degrees Fahrenheit; median particle size - 75 microns) coated with one percent (w/w) carbon black was fed at a half pound per minute rate along with 12.20 scfm dry nitrogen dispersant gas and 14.26 scfm dry nitrogen blanket gas. The temperature of the reactor core was raised in incremental steps until complete melting of the aluminum oxide was attained, yielding glassy, spherical beads. Such melting was observed to be complete at a temperature of the outer wall of the reactor core (measured by optical pyrometry) of 3861 degrees Fahrenheit which indicated a maximum temperature of solids within the reaction zone approximately one hundred degrees Fahrenheit lower than the pyrometer measurement.

Feed mixtures for the phosphorus tests were prepared by blending for one hour in a V-type blender the desired ground quantities of phosphate rock, phosphate rock flotation tailings, petroleum coke and about one and one-half percent (w/w) carbon black to obtain the feed compositions given in Table Ten. No petroleum coke was added in Test 22 but five scfm of propane was added as part of the dispersing gas as a carbon source. About a fifty percent excess of carbon was employed in these tests to insure adequate mixing in the small type reactor used in these tests. The silica content of the feeds was formulated from the acid insoluble fraction of the phosphate rock and phosphate flotation tailings. The $SiO_2/CaO$ ratio in test Nos. 17A, 18A, and 22 was 1.09, in test No. 30 this ratio was 0.76 and in test No. 28 it was 0.067. The purpose of the carbon black was to coat the other solid materials so that they would absorb the radiant energy from the reactor core (the carbon black would be unnecessary if the energy were supplied from other sources). The median particle size of the petroleum coke was fifty microns in all tests.

Test conditions are given in Table Eleven. The gases leaving the product collection box were below the condensation temperature of phosphorus (536 degrees Fahrenheit). Some condensation of phosphorus was evident on the solid product as the solid product burned on exposure to air. Water washing of the solid product indicated that the yields shown in Table Twelve are as much as five percent lower than the yields that would have been attained if the solid and gaseous products had been maintained at temperatures greater than 536 degrees Fahrenheit to prevent condensation. The residence time of the solids in the hot zone of the reactor was calculated to be within the range of 0.25–0.30 seconds.

The results shown in Table Twelve demonstrate the ability of the present invention to reduce phosphate rock to produce phosphorus. To our surprise, the yields in tests 17A, 18A and 22 exceed the highest yield reported by Chase et al (*Ind. Eng. Chem. Process Des. Dev.*, Vol 18, No. 2, 1979, p. 261) for a plasma jet reactor operating at considerably higher temperatures for comparable residence times. The large thermal gradients and inadequate mixing to form a calcium silicate product were problems for Chase et al that are overcome by the present invention.

The high yields in tests employing a higher silica content in contrast to the yield in test No. 28 demonstrate the benefit of producing a calcium silicate rather than a lime product. Whereas Chase et al report a solid product of similar size to the feed, the product in test No. 18A was glassy spheres having a median particle diameter 1.6 times larger than the feed (an increase in volume by more than a factor of four). This growth in particle size gives conclusive evidence that the present invention promotes mixing and the combination of particles within the reaction zone, a feature not found in the plasma-chemical type reactors because of the short residence time and large gas volumes.

The yield obtained for test No. 22 demonstrated that carbon obtained from cracking propane is equivalent to or better than coke as a carbon source. Test Nos. 18A and 22 demonstrate that carbon monoxide has no detectable effect on the yield.

Increased residence time or increased reaction temperature would apparently obtain near total release of phosphorus. However, greater residence time and high temperature are both beyond the capabilities of the equipment used in these tests.

EXAMPLE FIVE

This example demonstrates the production of phosphorus oxide from the thermal decomposition of phosphate rock by the present invention. The experiment described below was run the reactor described in Example One. Feed materials were introduced as in Example Four with a mixture of nitrogen and oxygen as the dispersant gas. Nitrogen was added as the blanket gas. Upon leaving the HTFW reactor, the material passed through a sixty-inch long, eighteen-inch diameter cooling zone prior to reaching a baffled solid product collection box where the gaseous and solid products were separated.

Feed mixtures were prepared by blending in a V-type blender for one hour ground samples of phosphate rock, clay, calcined petroleum coke and about one and one-half percent (w/w) carbon black to yield the feed mixture given in Table Thirteen. The carbon black was present to assure radiative absorption as in Example Four and also for fuel value. Oxygen was added at a rate approximately double the stoichiometric requirement for carbon combustion to yield carbon dioxide to insure oxidizing atmosphere within the reactor tube. Analysis of the solid product indicated about sixty percent of the carbon was combusted.

Reactor conditions employed in this test are given in Table Fourteen. The gases leaving the solid product collection box were at 504 degrees Fahrenheit, so some condensation of product phosphorus decaoxide (sublimation temperature=680 Fahrenheit) occurred. Since the smaller particles cool at a faster rate upon leaving the reactor tube, condensation would affect the calculated product yield for small particles more than for large particles.

The overall phosphorus oxide yield as calculated from the analysis of the solid product was 11.7 percent (Table Fifteen). However, analysis of the $-200$ Tyler mesh fraction (particles less than about 75 micron diameter) which accounted for 3.7 weight percent of the product gave an apparent phosphorus oxide yield of only 1.2 percent. Analysis of product in the $-35$, $+48$ Tyler mesh fraction (particles with diameters between 300 and 400 microns) which accounted for 27.2 weight percent of the product gave an apparent yield of 12.7 percent. The yield for particles in the $-65$, $+100$ Tyler mesh fraction (24.0 weight percent of the product) was 15.6 percent with lower yields for particles either larger or smaller particles than this size fraction.

Examination of representative samples of the $-200$ mesh and $-65$, $+100$ mesh fractions by Scanning Electron Microscope/Energy Dispersive X-ray analysis (SEM/EDX) revealed the reasons for the above noted size-yield relationships. FIG. Two is the SEM image of a representative sample of $-200$ mesh fraction from test No. 12 and Table Sixteen give the SEM/EDX analysis of the surface of particles identified in FIG. Two. FIG. Three and Table seventeen supply the corresponding information for the $-65$, $+100$ mesh product material. FIG. Four is the SEM image of particle two in FIG. Two.

The yields in Table 16 are calculated by the formula as follows:

Phosphorus in the phosphate rock feed minus the phosphorus left on the slag exiting the reactor divided by the phosphorus in the phosphate rock feed.

Figure 4:
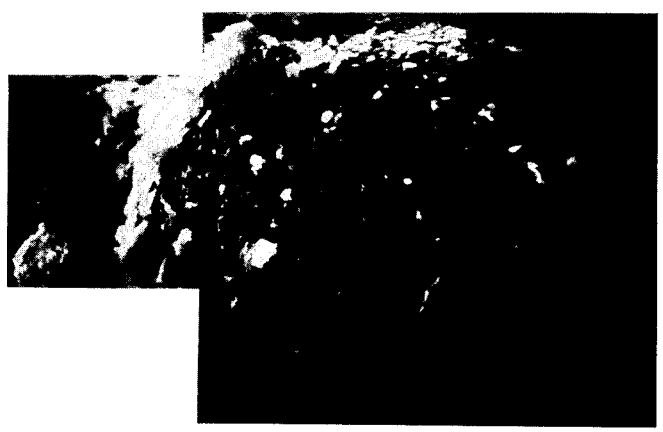
FIG. 4 is a scanning electron micrograph of particle number 2 in FIG. 2.

The negative yields reported in Table 16 are the result of condensation of phosphorus decaoxide on the surface of the slag particles. The remaining portion of the phosphorus which was converted from the phosphate rock in the reactor exits the reactor as gas. The condensed phosphorus products can be seen on the surface of the slag in FIG. 4. When the phosphorus on the surface of the slag is calculated and added to the phosphorus gas exit in the reactor, the yields in all cases are much larger than those of A. L. Mosse, et al (*2nd International Congress of Phosphorus Compounds Proceedings*, Institute Mondial du Phosphate, 1980), for phosphorus oxide production in plasmachemical reactors at about the same temperature. The limitations of the plasmachemical reactors of inadequate mixing to form a calcium silicate product, short residence time and thermal gradients cause much lower yields than the present invention.

The yields of Table 16 can be improved by reducing the size of the feed material, giving a larger surface area per unit weight to allow better release of the phosphorus decaoxide. Increased residence time and/or high temperature would also improve yields. A decrease in the feed oxygen to better match the carbon combustion stoichiometry would decrease the gas flow, allowing improved mixing (as would other methods of decreasing the gas flow). Further, separation of the solids from the gaseous products at a temperature exceeding the condensation temperature of the phosphorus decaoxide would also increase the yield.

EXAMPLE SIX

This example demonstrates how the higher temperature decomposition of other calcium minerals can be envisioned using the present invention. The decomposition of calcium fluoride in the presence of water vapor to yield hydrogen fluoride and lime,

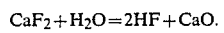

$$CaF_2 + H_2O = 2HF + CaO.$$

in such an example. At ambient temperatures the reverse reaction is favorable with a free energy of $-328$ KJ/mole. However, at a temperature of 4040 degrees Fahrenheit, the forward reaction proceeds with a free energy of $-687$ KJ/mole which is clearly favorble. This example exemplifies the extension of this process to the high temperature reaction of almost any calcium compound.

Although there has been described and illustrated in the examples hereinabove many particular embodiments of the invention for purposes of describing this invention, it will be recognized by those skilled in the art that the invention is not limited thereto. Accordingly, any and all modifications or variations which may occur to those skilled in the art should be considered to be within the scope of the invention as defined by the appended claims.

TABLE ONE

Analyses of Feed Components (Weight Percents)

| Component | Dried Phosphogypsum | Clay | Iron | Coke |
|---|---|---|---|---|
| $SiO_2$ | 2.77 | 67.33 | — | — |
| $Na_2O$ | 0.31 | 3.14 | — | — |
| $Fe_2O_3$ | 0.26 | 2.62 | 100.0 | — |
| $K_2O$ | 0.06 | 0.19 | — | — |
| CaO | 35.94 | 1.30 | — | — |
| MgO | 0.01 | 0.55 | — | — |
| $Al_2O_3$ | 0.53 | 15.22 | — | — |
| $SO_3$ | 52.22 | — | — | — |
| $P_2O_5$ | 0.94 | — | — | — |
| F | 0.28 | — | — | — |
| $H_2O$ | 6.68 | 9.65 | — | — |
| C | — | — | — | 90.82 |
| H | — | — | — | 2.09 |
| N | — | — | — | 2.22 |
| S | — | — | — | 2.49 |
| O | — | — | — | 2.38 |

TABLE TWO

Feed Mixture Composition

| Composition | % (W/W) |
|---|---|
| Phosphogypsum | 76.72 |
| Clay | 10.66 |
| Iron | 0.86 |
| Petro-Coke | 11.76 |

TABLE THREE

Test Run Summary

| Run | Feed Rate (lb./min.) | Temperature (°F.) | Blanket Gas (scfm) | Oxygen (scfm) | % Sulfur Release |
|---|---|---|---|---|---|
| 1A | 4.1 | 4450 | 41 | 10 | 80.2 |
| 2A | 1.7 | 4420 | 41 | 7.5 | 88.0 |
| 5A | 1.9 | 4425 | 41 | 5.0 | 89.5 |
| 14A | 1.1 | 4425 | 40 | 3.75 | 97.1 |
| 15A | 1.9 | 4425 | 40 | 7.5 | 90.6 |

TABLE FOUR

Chemical Analysis of Clinker Precursor

| Component | Batch A (%) | Batch B (%) | Commercial Clinker (%) |
|---|---|---|---|
| $SiO_2$ | 21.07 | 21.54 | 21.47 |
| $Al_2O_3$ | 4.51 | 4.61 | 6.19 |
| $Fe_2O_3$ | 3.15 | 3.23 | 2.54 |
| CaO | 66.81 | 66.11 | 67.26 |
| MgO | 0.49 | 0.50 | 1.26 |
| $SO_3$ | 1.04 | 1.04 | 0.08 |
| $Na_2O$ | 0.30 | 0.31 | 0.14 |
| $K_2O$ | 0.66 | 0.64 | 0.14 |
| $TiO_2$ | 0.12 | 0.12 | 0.30 |
| $P_2O_5$ | 1.31 | 1.34 | 0.17 |
| F | 0.33 | 0.34 | — |
| Bogue Composition | | | |
| $C_4AF$ | 9.6 | 9.8 | 7.7 |
| $C_3A$ | 6.6 | 6.8 | 12.1 |
| $C_2S$ | 2.3 | 9.1 | 12.2 |
| $C_3S$ | 77.1 | 69.8 | 65.4 |

TABLE FIVE

Clinker Tests

| Burn No. | Batch | Temperature (F.°) | Time (min.) | Clinker Free Lime (%) | $SO_3$(%) |
|---|---|---|---|---|---|
| BCR | A | 2250 | 60 | 2 | 0.63 |
| BC8 | A | 2730 | 20 | 2.4 | 0.37 |
| BC9 | | 2550 | 60 | 2 | 0.66 |
| BC10 | | 2730 | 20 | 2 | 0.43 |
| Commerical Clinker | — | — | — | 1.0 | 0.08 |

TABLE SIX

Grinding Tests

| Burn No. | Added Gypsum (%) | Final Blaine (cm²/g) | Total Grinding time (min.) |
|---|---|---|---|
| BC7 | 3.3 | 3493 | 133 |
| BC8 | 3.8 | 3537 | 145 |
| BC9 | 3.4 | 3412 | 164 |
| BC10 | 3.8 | 3650 | 175 |
| Commerical Clinker | 5.8 | 3426 | — |

TABLE SEVEN

Cube Tests

| Cement | Compressive Strengths (psi) | | | | Time of Set (hours) |
|---|---|---|---|---|---|
| | 1 day | 3 days | 7 days | 28 days | |
| BC7 | 1089 | 4759 | 5745 | 8015 | >7 |
| BC8 | 906 | 3526 | 4960 | | 7 |
| BC9 | 933 | 3790 | 4552 | 9060 | >6 |
| BC10 | 913 | 3493 | 4136 | 8103 | >6 |
| Commerical Clinker | 1188 | 3700 | 6950 | 10050 | 5.1 |
| ASTM C150 Type I | — | 1800 | 2800 | — | — |

TABLE EIGHT

Dried Phosphogypsum Analysis

| Component | Weight Percent |
|---|---|
| $SiO_2$ | 2.36 |
| $Na_2O$ | 0.26 |
| $Fe_2O_3$ | 0.22 |
| $K_2O$ | 0.05 |
| CaO | 30.57 |
| MgO | 0.01 |
| $Al_2O_3$ | 0.45 |
| $So_3$ | 44.42 |
| $P_2O_5$ | 0.80 |
| F | 0.24 |
| Total $H_2O$ | 20.62 |

TABLE NINE

Comparison of Experimental Results with Mathematical Model Results

| Run No. | Feed Type | Reactor Size (in.) | Tube Temp. (°F.) | Feed Rate (lb/min-ft²) | $N_2 + O$ SCFM/Ft³ | $SiO_2$ CaO | $Al_2O_3$ CaO | $FeO_3$ CaO | C CaO | $O_2$ CaO | Percent Sulfur Removal (Actual) | Percent Sulfur Removal (Calc.) |
|---|---|---|---|---|---|---|---|---|---|---|---|---|
| 10 | PGD | 3 | 4000 | 3.7 | 51 | 1.00 | .008 | .002 | 0 | 0 | 66.5 | 58.4 |
| 21 | PGD | 3 | 4000 | 4.9 | 38 | 2.79 | .228 | .027 | 0.4 | 0 | 74.2 | 74.0 |
| 24 | PGD | 3 | 4000 | 4.9 | 38 | 2.93 | .200 | .024 | 0 | 0 | 67.5 | 64.3 |
| 26 | PGD | 3 | 4000 | 4.9 | 38 | 2.93 | .200 | .024 | 0 | 0 | 74.4 | 63.5 |
| 32 | PGH | 3 | 4000 | 3.7 | 39 | 0.07 | .008 | .307 | 0 | 0 | 70.0 | 75.1 |
| 39 | PGH | 3 | 4000 | 4.9 | 39 | 0.07 | .008 | .002 | 0 | 0 | 37.1 | 38.8 |
| 47 | PGH | 3 | 4400 | 4.3 | 39 | 0.48 | .062 | .020 | 0 | 0 | 93.7 | 90.0 |
| 62 | PGH | 6 | 4450 | 10.4 | 42 | 0.31 | .040 | .017 | 1.8 | 2.3 | 88.0 | 92.7 |

TABLE NINE-continued

Comparison of Experimental Results with Mathematical Model Results

| Run No. | Feed Type | Reactor Size (in.) | Tube Temp. (°F.) | Feed Rate (lb/min-ft²) | N₂ + O SCFM/Ft³ | SiO₂ CaO | Al₂O₃ CaO | FeO₃ CaO | C CaO | O₂ CaO | Percent Sulfur Removal (Actual) | Percent Sulfur Removal (Calc.) |
|---|---|---|---|---|---|---|---|---|---|---|---|---|
| 65 | PGH | 6 | 4425 | 11.3 | 42 | 0.31 | .040 | .017 | 1.8 | 1.4 | 89.6 | 90.5 |
| 77 | PGH | 6 | 4425 | 11.5 | 41 | 0.31 | .040 | .017 | 1.8 | 2.1 | 90.7 | 90.7 |
| 83 | PGH | 6 | 4425 | 6.4 | 38 | 0.31 | .040 | .017 | 1.8 | 1.9 | 96.7 | 97.1 |

Note:
PGD - phosphogypsum, dihydrate
PGH - phosphogypsum, hemihydrate

TABLE TEN

Feed Compositions for Phosphorus Production Tests

| Test No.: | 17A | 18A | 22 | 28 | 30 |
|---|---|---|---|---|---|
| % CaO | 24.21 | 24.23 | 28.98 | 35.86 | 28.19 |
| % $P_2O_5$ | 17.05 | 17.09 | 20.10 | 25.86 | 19.32 |
| % F | 2.70 | 2.25 | 2.45 | 2.67 | 3.02 |
| % C | 15.69 | 16.10 | 2.98 | 22.59 | 17.27 |
| Non-Carbon Median Particle Size (microns) | 50 | 50 | 50 | 5–10 | 50 |

TABLE ELEVEN

Reactor Conditions for Phosphorus Production Tests

| Test No: | 17A | 18A | 22 | 28 | 30 |
|---|---|---|---|---|---|
| Core Outer Wall Temperature (°F.): | 4407 | 4407 | 4396 | 4408 | 4410 |
| Dispersant Gas: | | | | | |
| SCFM Nitrogen | 12.43 | 3.87 | 3.78 | 8.77 | 8.00 |
| SCFM Carbon Monoxide | 0 | 5.00 | 5.00 | 0 | 0 |
| SCFM Propane | 0 | 0 | 1.1 | 0 | 0 |
| Blanket Gas: SCFM Nitrogen | 14.39 | 19.08 | 18.60 | 18.68 | 18.92 |
| Solids Feed Rate: (lbs./min.) | 0.57 | 0.65 | 0.59 | 0.60 | 0.61 |
| Temperature (°F.) Gases leaving product collection box: | 299 | 308 | 319 | 393 | 351 |

TABLE TWELVE

Solid Product Composition for Phosphorus Tests

| Test No.: | 17A | 18A | 22 | 28 | 30 |
|---|---|---|---|---|---|
| % CaO | 33.46 | 32.22 | 38.44 | 53.19 | 40.32 |
| % $P_2O_5$ | 3.45 | 3.62 | 3.37 | 12.54 | 5.24 |
| % F | 1.25 | 1.59 | 0.92 | 2.58 | 2.48 |
| % C | 8.70 | 14.37 | 1.01 | 16.27 | 14.39 |
| Median Particle Size (microns) | 75 | 80 | 95 | 60 | 75 |
| Yield (from slag analysis) | 85.4 | 84.1 | 87.4 | 67.3 | 81.0 |

TABLE THIRTEEN

Feed Composition for Phosphorus Oxide Test

| Test No.: | 12 |
|---|---|
| % CaO | 21.92 |
| % $P_2O_5$ | 15.38 |
| % F | 1.41 |
| % C | 7.43 |
| Median Particle Size (microns) | 210 |

TABLE FOURTEEN

Reactor Conditions for Phosphorus Oxide Test

| Test No.: | 12 |
|---|---|
| Core Outer Wall Temperature (°F.) | 4415 |
| Oxygen Feed Rate (SCFM) | 2.15 |
| Nitrogen Feed Rate (SCFM) | 42.50 |
| Solids Feed Rate (lbs./min.) | 0.45 |
| Temperature (°F.) Gases Leaving Product Collection Box | 504 |

TABLE FIFTEEN

Product Composition for Phosphorus Oxide Test

| Test No.: | 12 |
|---|---|
| % CaO | 27.35 |
| % $P_2O_5$ | 16.94 |
| Median Particle Size (microns) | 205 |
| Yield from Slag Analysis | 11.7 |

TABLE SIXTEEN

Surface Analysis (SEM/EDX) of −200 Mesh Particles in Test No. 12

| Particle* No. | P/Ca Atomic Ratio | Si/Ca Atomic Ratio | Apparent Yield (%) | Comment |
|---|---|---|---|---|
| 1 | 0.46 | 0.72 | 16.6 | |
| 2 | 1.96 | 1.76 | −255 | |
| 3 | 1.35 | 1.21 | −144 | Carbon particle |
| 4 | 0.39 | 1.02 | 29.4 | |
| 5 | 0.50 | 0.51 | 9.7 | |
| 6 | 0.50 | 0.04 | 8.9 | |
| 7 | 2.82 | 26.63 | −409 | Fused clay particle |
| 8 | 0.52 | 0.50 | 5.8 | |
| 9 | 34.7 | 320.5 | −6171 | Clay particle |
| 10 | 1.16 | 1.57 | −109 | Carbon particle |

Figure 2:
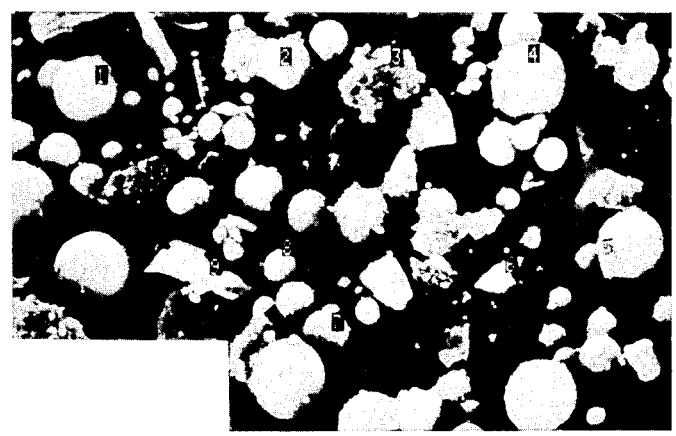
FIG. 2 is a scanning electron micrograph image of a representative sample of the −200 mesh fraction from test No. 12.

*Identified in FIG. 2.

TABLE SEVENTEEN

Surface Analysis (SEM/EDX) of −65, +100 Mesh Particles in Test No. 12

| Particle* No. | P/Ca Atomic Ratio | Si/Ca Atomic Ratio | Apparent Yield (%) |
|---|---|---|---|
| 1 | 0.16 | 0.72 | 70.7 |
| 2 | 0.29 | 0.23 | 46.8 |
| 3 | 0.21 | 0.95 | 62.0 |
| 4 | 0.29 | 0.90 | 26.5 |
| 5 | 0.22 | 1.16 | 61.1 |
| 6 | 0.46 | 1.02 | 15.5 |
| 7 | 0.41 | 0.69 | 25.9 |
| 8 | 0.38 | 0.90 | 30.5 |
| 9 | 0.31 | 0.67 | 43.8 |
| 10 | 0.47 | 1.14 | 15.7 |

Figure 3:
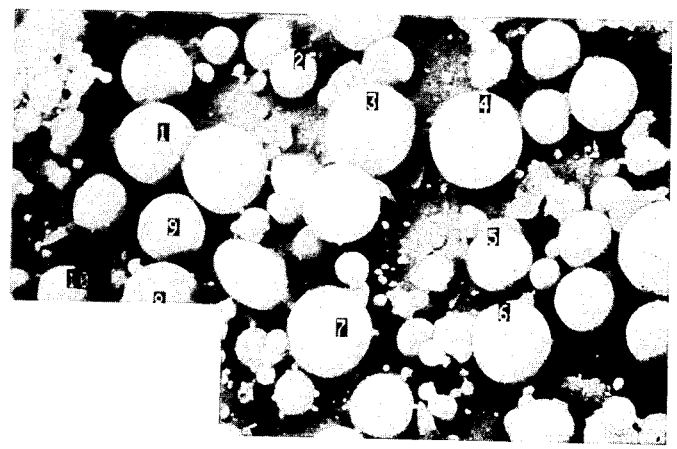
FIG. 3 is a scanning electron micrograph of a representative sample for the −65, +100 mesh product material.

*Identified in FIG. 3.

What is claimed as new and desired to be secured by Letters Patent of the United States is:

1. A non-plasma process for the conversion of a calcium sulfate or calcium phosphate mineral in a reducing or oxidizing atmosphere into a calcium containing solid product and a gaseous stream, which comprises the steps of:
   (i) mixing said calcium sulfate or calcium phosphate mineral with a fossil fuel, said fossil fuel comprising the only the combustable fuel source in said process; and
   (ii) combusting said fossil fuel in the presence of a stoichiometric or excess amount of a source of oxygen, thereby subjecting said calcium sulfate or calcium phosphate mineral to a temperature in excess of 3400° F. for less than one minute.

2. The process of claim 1 wherein said calcium sulfate is decomposed into lime and a gaseous stream containing sulfur oxides in a neutral to oxidizing atmosphere.

3. The process of claim 2 wherein said calcium sulfate is chemical calcium sulfate.

4. The process of claim 2 wherein said calcium sulfate is blended with silica, aluminum and iron oxide and the mixture subjected to a temperature in excess of about 3400 degrees Fahrenheit for less than one minute in a neutral to oxidizing atmosphere and recovering sulfur oxides and cement clinker precursor.

5. The process of claim 4 wherein said calcium sulfate, silica, alumina and iron oxide are mixed with a fossil fuel prior to reaction wherein said fossil fuel provides all or at least a portion of the total energy input necessary to convert said calcium sulfate feed mixture to sulfur oxides and cement clinker precursor.

6. The process of claim 1 wherein said calcium phosphate mineral is phosphate rock which is converted into elemental phosphate and a solid calcium product which comprises mixing said phosphate rock with a fossil fuel prior to reaction wherein said fossil fuel is combusted in a reducing atmosphere at temperatures in excess of 3400 degrees Fahrenheit.

7. The process of claim 1 wherein said calcium phosphate mineral is phosphate rock which is converted into phosphorus oxides and a solid calcium product which comprises mixing said phosphate rock with a fossil fuel prior to reaction wherein said fossil fuel is combusted at temperatures in excess of about 3400 degrees Fahrenheit in an oxidizing atmosphere.

8. The process of any one of claim 1, wherein all or at least a portion of the heat required to attain the desired reaction temperature is furnished by electrical energy.

9. The process of claim 1, wherein said combusting step is performed in a high temperature fluid wall reactor.

10. The process of claim 1, wherein said fossil fuel is selected from the group consisting of petroleum coke, coal, heavy oils, natural gas and methane.

* * * * *

UNITED STATES PATENT AND TRADEMARK OFFICE
CERTIFICATE OF CORRECTION

PATENT NO.   : 4,774,064
DATED        : SEPTEMBER 27, 1988
INVENTOR(S)  : ARNOLD ET AL

It is certified that error appears in the above-identified patent and that said Letters Patent is hereby corrected as shown below:

Column 8, line 3 change "manuaacture" to --manufacture--.

Column 8, line 43 change "MgO: max.;" to --MgO: 6.0% max.;--.

Column 8, line 43 change "LOI;" to --$SO_3$: 3.0% max.; LOI;--.

Column 9, line 57 change "by drying only one of" to --by drying either--.

Column 14, line 32 change "soleds" to --solids--.

Column 15, line 52 change "$Fe_2O_3$/Ca" to --$Fe_2O_3$/CaO--.

Column 15, line 64 change "(-" to --(--.

Column 21, line 18 change "was run the" to --was run in the--.

Column 21, line 61 change "smaller particles than" to --smaller than--.

Column 27, line 10 change "the only the combustable" to --the only combustible--.

UNITED STATES PATENT AND TRADEMARK OFFICE
CERTIFICATE OF CORRECTION

PATENT NO. : 4,774,064

DATED : SEPTEMBER 27, 1988

INVENTOR(S) : ARNOLD ET AL

It is certified that error appears in the above-identified patent and that said Letters Patent is hereby corrected as shown below:

Column 28, line 7 change "phosphate" to --phosphorus--.

Column 28, line 20 change "process of any one of claim" to --process of claim--.

Signed and Sealed this

Tenth Day of October, 1989

Attest:

DONALD J. QUIGG

Attesting Officer

Commissioner of Patents and Trademarks